(12) United States Patent
Sukhman et al.

(10) Patent No.: US 9,354,630 B2
(45) Date of Patent: May 31, 2016

(54) FLEXIBLE LASER MANUFACTURING SYSTEMS AND ASSOCIATED METHODS OF USE AND MANUFACTURE

(75) Inventors: Yefim P. Sukhman, Scottsdale, AZ (US); Joseph T. Hillman, Chandler, AZ (US); Miesha T. Stoute, Laveen, AZ (US); James W. Rabideau, Fountain Hills, AZ (US); Christian J. Risser, Scottsdale, AZ (US)

(73) Assignee: Universal Laser Systems, Inc., Scottsdale, AZ (US)

( * ) Notice: Subject to any disclaimer, the term of this patent is extended or adjusted under 35 U.S.C. 154(b) by 983 days.

(21) Appl. No.: 13/204,076

(22) Filed: Aug. 5, 2011

(65) Prior Publication Data

US 2012/0296461 A1     Nov. 22, 2012

Related U.S. Application Data

(60) Provisional application No. 61/488,070, filed on May 19, 2011.

(51) Int. Cl.
    *G05B 19/418*     (2006.01)
(52) U.S. Cl.
    CPC ...... *G05B 19/41865* (2013.01); *G05B 2219/45165* (2013.01); *Y02P 90/20* (2015.11); *Y02P 90/22* (2015.11)

(58) Field of Classification Search
    None
    See application file for complete search history.

(56) References Cited

U.S. PATENT DOCUMENTS

| | | |
|---|---|---|
| 5,278,751 A | 1/1994 | Adiano et al. |
| 5,315,509 A | 5/1994 | Natarajan |
| 5,777,877 A | 7/1998 | Beppu et al. |
| 6,424,670 B1 | 7/2002 | Sukhman et al. |
| 6,459,946 B1 * | 10/2002 | Villanova et al. ............ 700/111 |
| 7,054,702 B1 | 5/2006 | Barto et al. |
| 7,069,101 B1 | 6/2006 | Arackaparambil et al. |
| 7,103,444 B1 | 9/2006 | Reitmeyer et al. |
| 7,489,982 B2 | 2/2009 | Liu et al. |
| 7,610,112 B2 | 10/2009 | Knipfer et al. |
| 7,610,177 B2 | 10/2009 | Subramanian et al. |
| 2002/0097205 A1 | 7/2002 | Nakamura |
| 2002/0169941 A1 | 11/2002 | Eustis |
| 2003/0085921 A1 | 5/2003 | Ghosh et al. |
| 2003/0102290 A1 * | 6/2003 | Shaffer .................... 219/121.69 |
| 2004/0041389 A1 | 3/2004 | Nishide et al. |
| 2005/0114202 A1 * | 5/2005 | Chua et al. ...................... 705/10 |
| 2005/0205537 A1 * | 9/2005 | Penz et al. ............... 219/121.72 |
| 2009/0177789 A1 | 7/2009 | Choudhury |
| 2009/0216494 A1 | 8/2009 | Stadler et al. |
| 2010/0083029 A1 | 4/2010 | Erickson et al. |
| 2010/0122970 A1 * | 5/2010 | Caristan ................... 219/121.72 |
| 2010/0296546 A1 * | 11/2010 | Weick et al. .................. 374/137 |
| 2011/0210107 A1 * | 9/2011 | Hammann et al. ....... 219/121.72 |

* cited by examiner

*Primary Examiner* — Sean Schechtman
*Assistant Examiner* — Steven Garland
(74) *Attorney, Agent, or Firm* — Perkins Coie LLP

(57) ABSTRACT

Embodiments of flexible laser manufacturing systems are disclosed herein. A flexible laser manufacturing system configured in accordance with one embodiment includes a plurality of laser processing stations. Each laser processing station can include a laser source configured to generate a laser beam for processing target material, and a first controller coupled to the laser source. The flexible laser manufacturing system also includes a second controller coupled to the first controller of the individual laser processing stations. The second controller is configured to monitor and instruct each of the first controllers for processing target material of each of the corresponding laser processing stations.

26 Claims, 7 Drawing Sheets

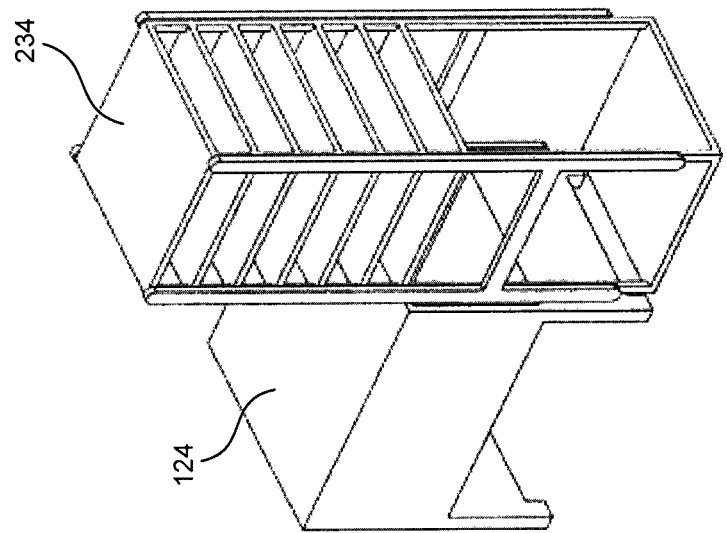
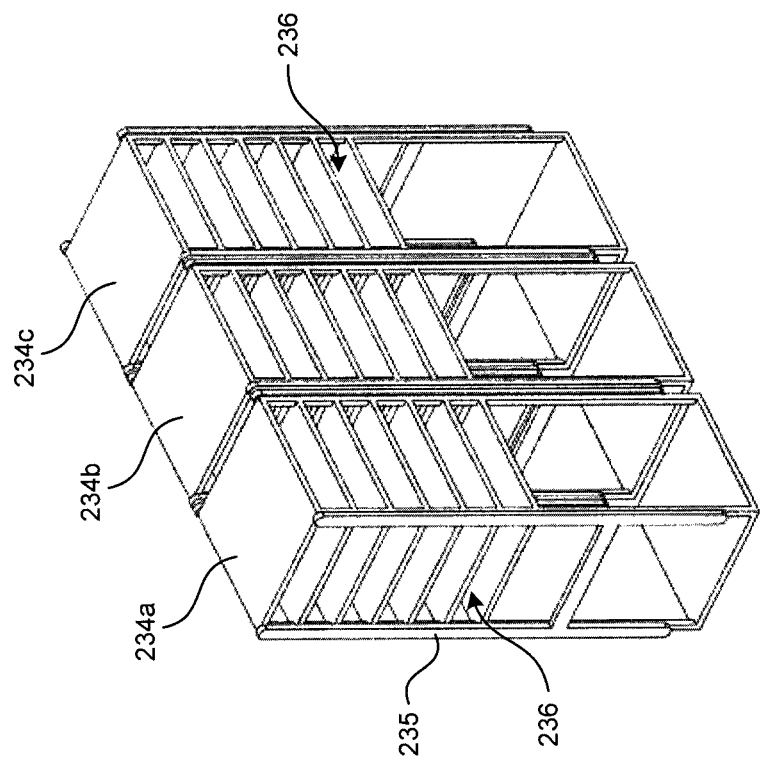
FIG. 2A
FIG. 2B

FLEXIBLE LASER MANUFACTURING SYSTEMS AND ASSOCIATED METHODS OF USE AND MANUFACTURE

CROSS-REFERENCE TO RELATED APPLICATIONS

This application claims the benefit of U.S. Provisional Application No. 61/488,070, entitled "FLEXIBLE LASER MANUFACTURING SYSTEMS AND ASSOCIATED METHODS OF USE AND MANUFACTURE," filed May 19, 2011, and incorporated by reference herein in its entirety.

TECHNICAL FIELD

The present disclosure is directed generally to flexible laser processing systems and, more specifically, to laser processing systems including multiple laser processing stations that are arranged in an arrayed configuration.

BACKGROUND

Laser processing stations are being adopted in manufacturing for material processing at an ever increasing rate. Laser processing stations offer many advantages over more conventional processing applications. For example, laser processing stations are particularly suited for cutting shapes or profiles out of materials, marking or preparing materials by removing or modifying surface layers of materials, and welding or sintering materials, because they offer the advantage of providing non-contact, tool-less, and fixture-less methods of processing materials. In many cases, laser processing stations are replacing processes that require investments in tooling such as dies for die cutting, masks for silk screening, or templates and fixtures for hard tooling.

BRIEF DESCRIPTION OF THE DRAWINGS

FIGS. 2A-2E are a series of schematic isometric views of laser processing stations and associated target material handling assemblies configured in accordance with various embodiments of the disclosure.

DETAILED DESCRIPTION

Figure 1A:
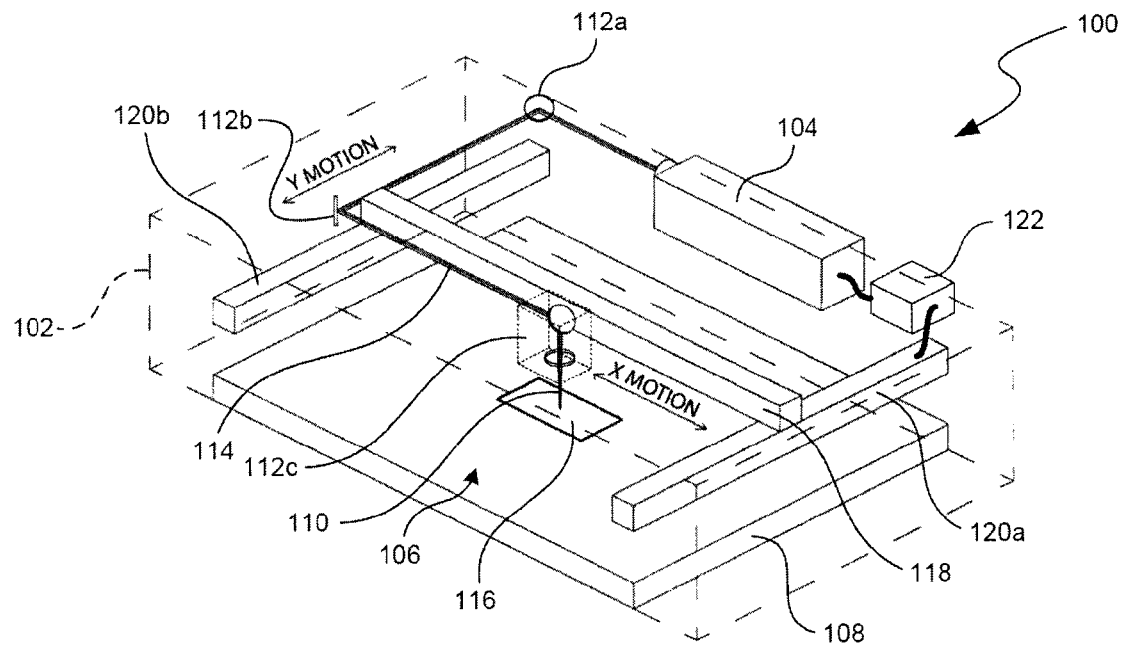
FIG. 1A is a schematic isometric view of a laser processing station configured in accordance with an embodiment of the disclosure.

The following disclosure describes various embodiments of systems and methods for operating and controlling networked laser processing stations. In one embodiment, a flexible laser manufacturing system includes an array of multiple laser processing stations. Each laser processing station can include a platform configured to support a target material to be processed and position it at the focal plane of the laser processing area. Each laser processing station can also include a laser source configured to emit a laser beam for processing target material. Each laser processing station can further include a laser beam delivery assembly configured to direct the laser beam relative to a target material, and a control module coupled to each of the laser source and the laser beam delivery assembly. The control module is configured to control the laser source and the laser beam delivery assembly. The flexible laser manufacturing system also includes a controller operably coupled to the array of multiple laser processing stations. The controller is configured to monitor a processing status of each of the laser processing stations, as well as to send processing parameters or instructions to the corresponding control modules of each of the laser processing stations.

In another embodiment, a flexible laser manufacturing system includes a plurality of laser processing stations. Each of the laser processing stations can include a laser source configured to generate a laser beam for processing a target material, and a first controller coupled to the laser source. The flexible laser manufacturing system also includes a second controller coupled to the first controller of the individual laser processing stations. The second controller is configured to monitor each of the laser processing stations and send processing instructions to each of the first controllers for processing a target material of the corresponding laser processing stations.

According to additional embodiments of the disclosure, a method of controlling a networked array of multiple laser processing stations includes receiving processing parameters relating to a laser processing operation and determining a production rate for each laser processing station that is available in the array of laser processing stations. The method also includes determining the number of laser processing stations that are required to achieve a desired processing production rate and sending the processing instructions to the corresponding laser processing stations in the array that can meet the desired processing production rate. The method can further include monitoring the status of each of the laser processing stations and updating the processing instructions as required.

Certain details are set forth in the following description and in FIGS. 1A-5 to provide a thorough understanding of various embodiments of the disclosure. Other details describing well-known structures and systems often associated with laser processing stations and methods for forming and using such stations, are not set forth in the following disclosure to avoid unnecessarily obscuring the description of the various embodiments of the disclosure.

Many of the details, dimensions, angles and/or other portions shown in the Figures are merely illustrative of particular embodiments of the disclosure and may be schematically illustrated. As such, the schematic illustration of the features shown in the Figures is not intended to limit any structural features or configurations of the processing stations disclosed herein. Accordingly, other embodiments can have other details, dimensions, angles and/or portions without departing from the spirit or scope of the present disclosure. In addition, further embodiments of the disclosure may be practiced without several of the details described below, while still other embodiments of the disclosure may be practiced with additional details and/or portions.

FIG. 1A is a schematic isometric view of a laser processing station or assembly 100 ("assembly 100") configured in accordance with an embodiment of the disclosure. In the illustrated embodiment, the assembly 100 includes an enclosure 102 (shown in broken lines) at least partially housing or supporting a laser source 104 and a laser beam delivery assembly 106. The laser source 104 can include any of a variety of radiation or other laser-based material processing tools as are known in the art. These may include, for example, a gas laser, a solid-state laser, a semiconductor laser, a dye laser, a fiber laser, or any combination of these. As will also be appreciated by one of ordinary skill in the art, the nature of the laser or material processing source may depend upon the intended application for laser-based material processing stations. For example, in an assembly 100 used for material marking, the laser source 104 can be a carbon dioxide gas laser or an Nd:YAG laser. In still further embodiments, the assembly 100 can include more than one laser source 104.

The laser beam delivery assembly 106 is configured to redirect and/or focus a laser beam 110 radiating from the laser source 104. For example, the laser beam delivery assembly 106 can include multiple laser redirectors or reflectors 112 (identified individually as a first through third reflectors 112a-112c). The reflectors 112 are configured to direct the laser beam 110 along a laser beam path 114 and/or focus the laser beam 110 at a target material 116 supported by the base 108. The laser beam delivery assembly 106 is also configured to direct the laser beam 110 in multiple directions relative to a target material 116 (e.g., in the x and y directions). More specifically, the laser beam delivery assembly 106 can include a bridge 118 that spans opposing tracks or supports 120 (identified individually as a first support 120a and a second support 120b). In the illustrated embodiment, the bridge carries two reflectors 112 and is movable on the supports 120 in a first direction (e.g., the y direction) relative to a target material 116. Moreover, at least one of the reflectors 112 is movable along the bridge 118 relative to a target material 116 in a second directly generally perpendicular to the first direction (e.g., in the x direction) for directing the laser beam 110 to process a target material 116.

According to additional features of the illustrated embodiment, the assembly 100 further includes a controller 122 operably coupled to the laser source 104 and the laser beam delivery assembly 106. The controller 122 is configured to manage operation of the individual laser processing station 100. For example, the controller 122 can be configured to manage the power output and laser modulation rate of the laser source 104, as well as the speed of the laser beam delivery assembly 106. Moreover, one of ordinary skill in the art will appreciate that the controller 122 can be a special purpose computer or data processor that can be specifically programmed, configured, or otherwise constructed to perform and/or store one or more of the computer-executable instructions explained in detail below. In addition, the assembly 100 can also include a power source (not shown) operably coupled to the laser source 104 and/or the controller 122.

Figure 1B:
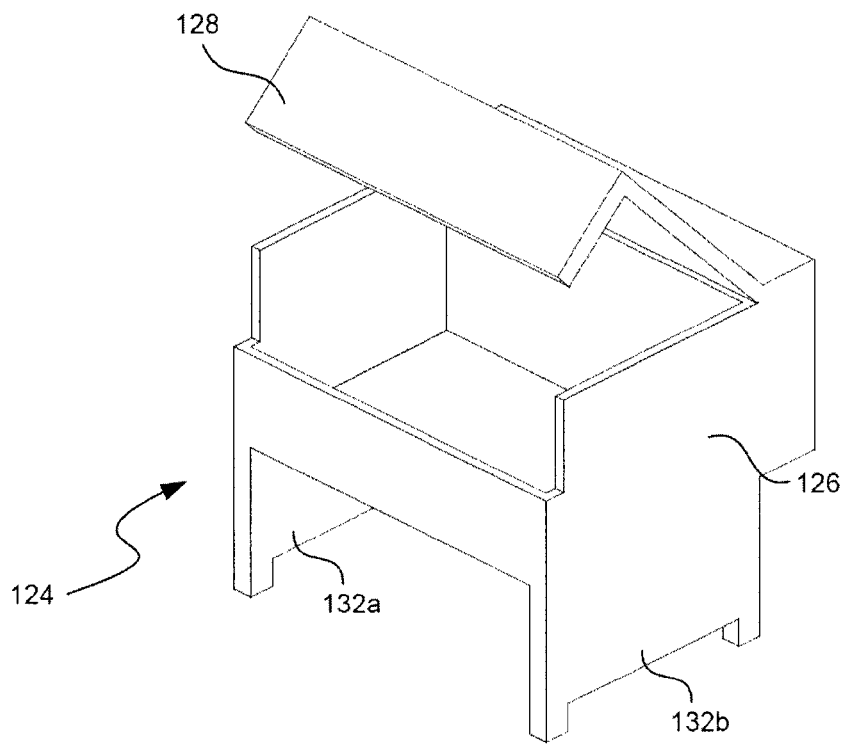
FIG. 1B is an isometric view of a laser processing station configured in accordance with an embodiment of the disclosure.

FIG. 1B is an isometric view of a laser processing station 124 configured in accordance with an embodiment of the disclosure. The processing station 124 includes a support structure or cabinet 126 that is configured to house a laser processing assembly, such as the laser processing station 100 described above with reference to FIG. 1A. As such, in certain embodiments the cabinet 126 can include one or more doors or panels 128 for accessing the enclosed laser processing assembly. For example, the panels 128 can provide access to load or adjust target processing materials. In addition, the cabinet 126 can also include supports or legs 132 (identified individually as a first leg 132a and a second leg 132b) to position the cabinet 126 at a convenient height. One of ordinary skill in the art will recognize that although a specific structure of the processing station 124 is illustrated in FIG. 1B, processing stations configured in accordance with embodiments of the disclosure are not limited to the structure or configuration illustrated in FIG. 1B.

Figure 2C:
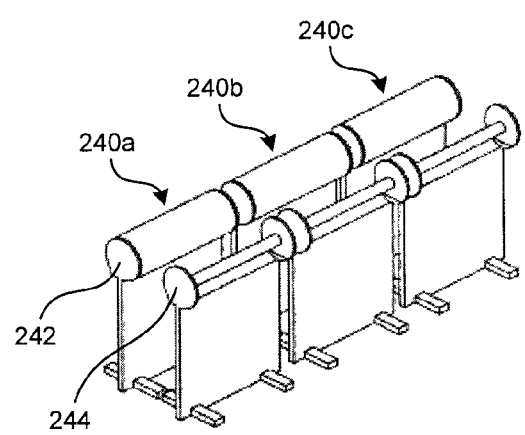

FIGS. 2A-2E are a series of schematic isometric views of laser processing stations including various material handling assemblies or mechanisms configured in accordance with various embodiments of the disclosure. Referring first to FIGS. 2A and 2B, FIG. 2A illustrates a series of batch material handling assemblies 234 (identified individually as first-third batch material handling assemblies 234a-234c). Each batch material handling assembly 234 is configured to hold multiple separate sheets or trays of a target material that is to be laser processed. For example, each batch material handling assembly 234 includes a frame 235 defining multiple openings 236. Each opening 236 is configured to receive and support a corresponding sheet or tray of target material. As shown in FIG. 2B, a batch material handling assembly 234 can be positioned next to a corresponding laser processing station 124, such as the processing station 124 described above with reference to FIG. 1B. Accordingly, the batch material handling assembly 234 illustrated in FIG. 2B allows the controller to index sheets or trays of target material in and out of the processing station 124.

Figure 2D:
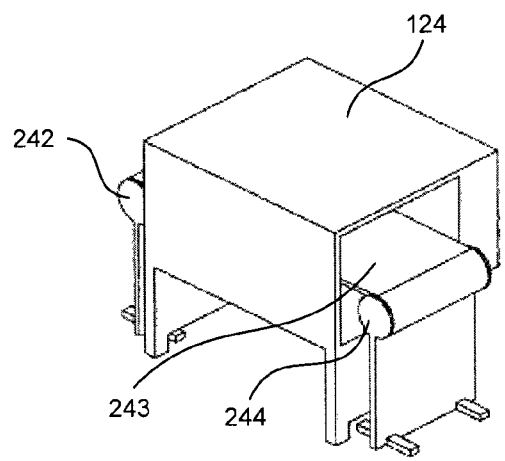

Referring next to FIGS. 2C and 2D, FIG. 2C illustrates a series of roller material handling assemblies 240 (identified individually as first-third roller material handling assemblies 240a-240c). Each roller material handling assembly 240 is configured to hold a roll of target material that is to be laser processed. More specifically, each roller material handling assembly includes a first or starting spool 242 and a second or return spool 244 of target material. The first and second spools 242, 244 are configured to feed a rolled sheet of target material for laser processing. For example, as shown in FIG. 2D, the laser processing station 124 can be positioned between the first and second spools 242 to pass a target material 243 through the laser processing station 124.

Figure 2E:
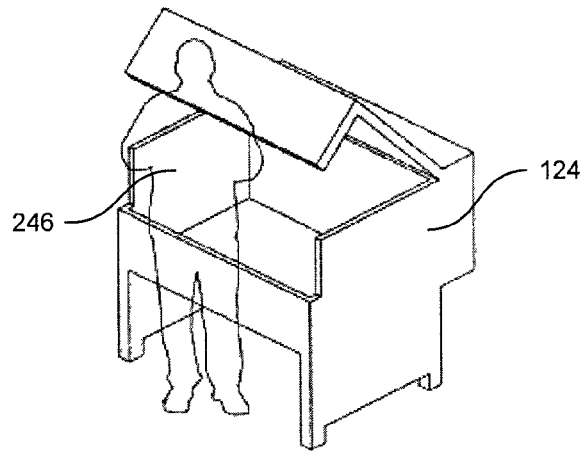

Referring next to FIG. 2E, according to additional embodiments of the disclosure an operator 246 can load individual pieces or sheets of target material into a laser processing station 124 when prompted to do so by the controller. One of ordinary skill in the art will appreciate that although the embodiments described above with reference to FIGS. 2A-2E are representative of several material handling assemblies and methods configured in accordance with embodiments of the disclosure, in other embodiments different suitable material handling, assembling, and/or delivery assemblies and methods can be used to load and unload target materials in the corresponding laser processing stations. Moreover, the material handling assemblies described herein can be modular so that the associated laser processing station 124 can be quickly reconfigured with different material handling assemblies to match processing requirements.

Figures 3A, 3B:
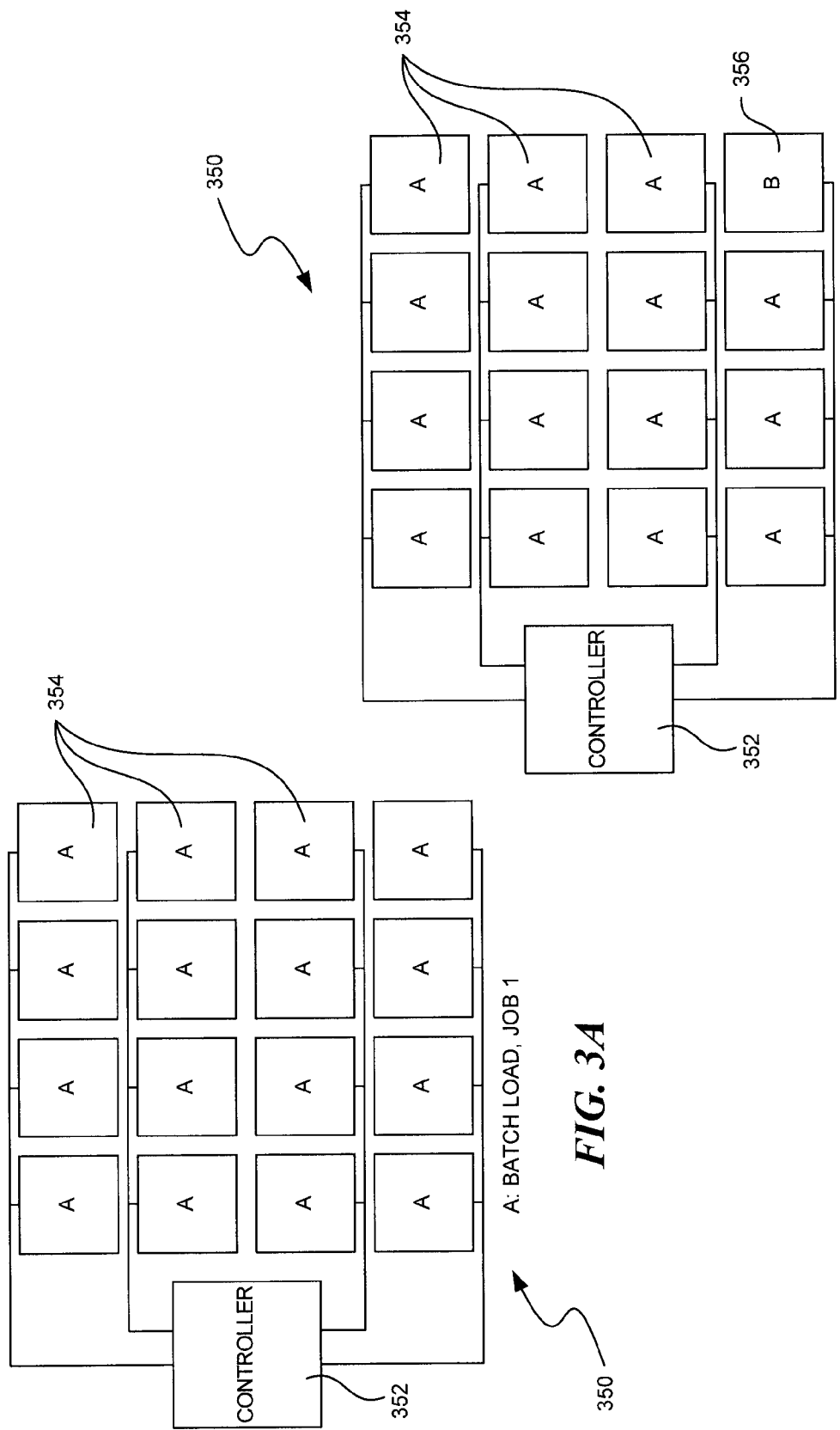
FIGS. 3A-3D are a series of block diagrams schematically illustrating a system including an array of interconnected or networked laser processing stations configured in accordance with embodiments of the disclosure.

FIGS. 3A-3D are a series of block diagrams schematically illustrating a system 350 configured in accordance with embodiments of the disclosure. Referring to FIG. 3A, the system 350 includes a master controller 352 that is operably coupled to an array of multiple individual laser processing stations 354. The individual laser processing stations 354 can include features that are generally similar in structure and function to the laser processing station 124, and/or the material handling and delivery assemblies described above with reference to FIGS. 1A-2E. According to additional features of the embodiment illustrated in FIG. 3A and as described in detail below, the laser processing stations 354 are arranged in a networked configuration and accordingly interconnected to one another, as well as to the controller 352. The controller 352 is configured to monitor and manage the processing of the networked processing stations 354. For example, the controller 352 can monitor a processing status of each of the laser processing stations 354, as well as send instructions to and/or receive instructions from the individual controllers of the corresponding processing stations 354. Each processing station 354 can be of a generally standard configuration that is designed to provide a broad range of laser processing capabilities including cutting, marking, and surface texturing of various target materials. Moreover, each processing station 354 can support lasers of processing parameters (e.g., power levels, laser wavelengths, etc.) that can be easily exchanged to reconfigure the processing stations 354 in the arrayed system 350 as needed. For example, the individual processing stations 354 can include the interchangeable laser processing stations as disclosed in U.S. Pat. No. 6,424,670, which is incorporated herein by reference in its entirety.

According to additional features of the illustrated embodiment, the controller 352 is configured to remotely control all of the processing stations 354 in the system 350 to configure all of the processing stations 354 in the arrayed system 350 from a single location. For example, the controller 352 can send processing instructions or parameters to the individual processing stations 354. The controller 352 can further be configured to store or access data relating to the individual processing stations 354. For example, the controller 352 can catalog or access a database of the lasers currently installed in the individual processing stations 354. As such, the processing instructions that the controller 352 sends to each processing station 354 can be specific to or otherwise take into account the processing parameters of the corresponding processing stations 354 (e.g., laser power output, motion system speed, laser modulation rate, productivity rate, etc.).

The controller 352 can also catalog or access a database of the type of material handling assembly associated with each of the processing stations 354. The controller 352 can also monitor or control the target material loading and removal of the individual processing stations 354. For example, if the material loading assembly associated with each processing station 354 includes an automated or semi-automated process, such as the material handling assemblies described above with reference to FIGS. 2A-2D, the controller 352 is able to monitor or control the material loading process as part of the overall productivity management of each processing station 354 in the array.

According to additional features of the illustrated embodiment, the controller 352 can deploy material processing instructions for a particular job to all of the processing stations 354 or to a portion or subset of the processing stations 354 in the system 350. For example, the controller 352 can divide the array of processing stations 354 into multiple subsets and assign different material processing jobs or parameters to each subset to flexibly accommodate production demands for multiple finished parts. The controller 352 can also simulate and then monitor productivity rate estimates of various subsets of the array running a particular material processing job to determine the minimum required subset of the processing stations 354 in the system 350 to accommodate a desired production rate and/or quantity requirement. The controller 352 can further use the estimated productivity rates for a particular job to allocate the appropriate subset of the required processing stations 354 to achieve the requested production rate and quantity.

The controller 352 can also be configured to reassign jobs to other processing stations 354 in the arrayed system 350 to dynamically maintain desired productivity requirements if a processing station 354 stops functioning or reports a problem requiring down time to address or repair. Moreover, the controller 352 can also be configured to monitor real-time or actual productivity of the individual processing stations 354 and either alert the operator if a processing station 354 is falling behind a desired productivity threshold, or redistribute the job or processing parameters to other processing stations 354 in the array to dynamically maintain desired productivity levels. The controller 352 can further monitor the status of all of the processing stations 354 and generate an alert if a processing station is not properly functioning or otherwise reporting a problem.

Several of these features are illustrated in FIGS. 3A-3D. For example, as shown in FIG. 3A, for purposes of illustration each of the processing stations 354 displays an "A" indicating a first processing job that the controller 352 has sent to each of the processing stations 354. The first processing job A can be associated with any laser processing task or process. For instance, the first processing job A can include marking or engraving target material that is batch loaded in a semi-automated process in the corresponding individual processing stations 354. As shown in FIG. 3A, all of the processing stations 354 can be controlled to work on or complete the first job A.

In FIG. 3B, a single processing station 356 displays a "B" indicating that a processing station has been taken offline temporarily to run a preproduction test of job B manually in preparation for introduction of job B into production. The remainder of the processing stations 354, however, continue processing the first job A. The second processing job B can also be associated with any laser processing task. For instance, the second processing job B can include testing or research and development for a specific laser processing task. Moreover, the second processing job B can be associated with target material that is manually loaded into the processing station 356 by an operator.

Figures 3C, 3D:
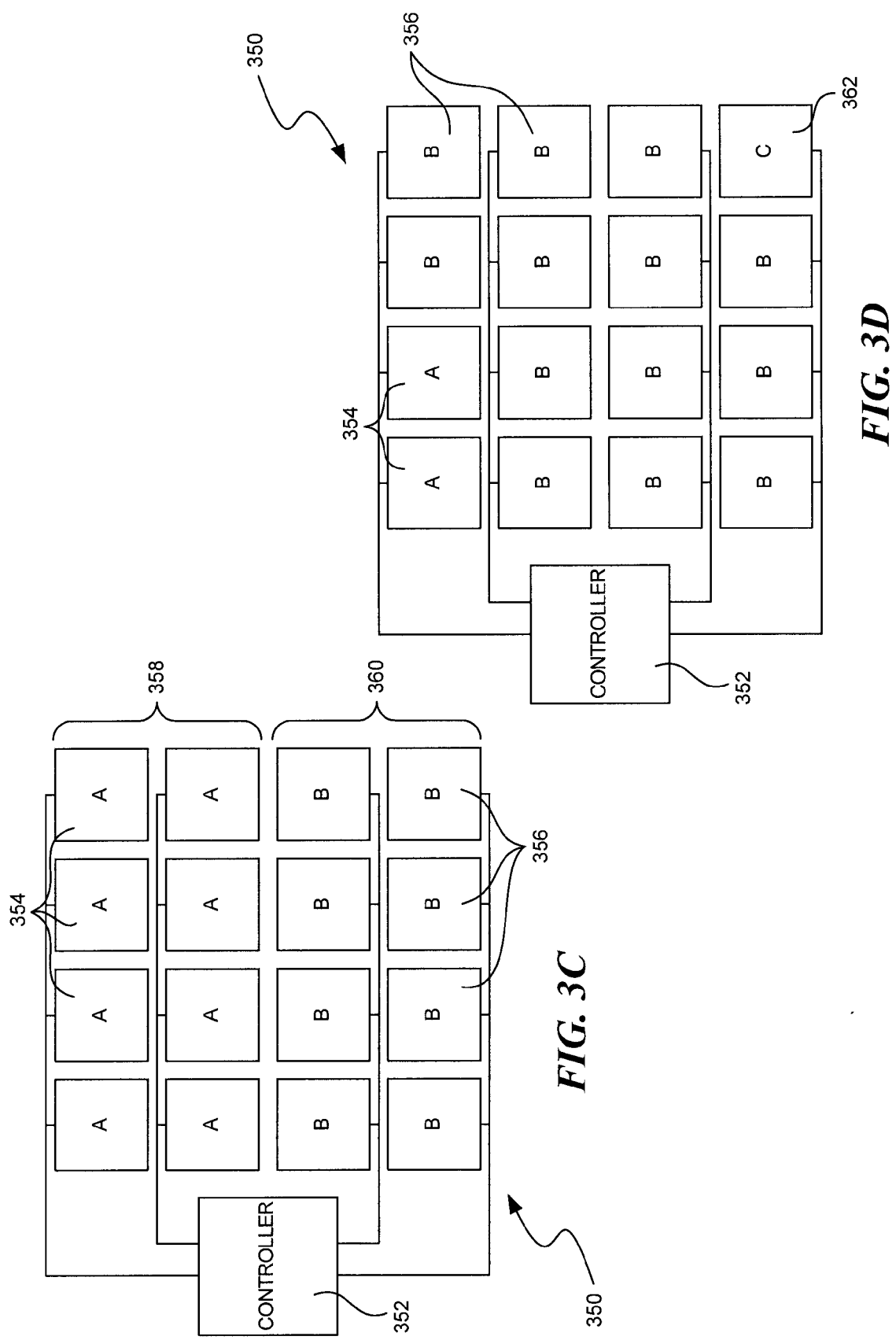

In FIG. 3C, the controller 352 has determined that a larger subset of the processing stations 356 can be deployed to carry out the second job B. More specifically, a first subset 358 of the processing stations 354 can receive instructions associated with the first job A, and a second subset 360 of the processing stations 356 can receive instructions associated with the second job B. The second processing job B can include one or more processing parameters that differ from the first processing job A. For example, the second processing job B can differ from the first job A based at least in part on a different target material, material delivery assembly, laser processing instructions, etc. In one embodiment, for example, the first processing job A can be associated with a first target material that is batch loaded with the first subset 358 of corresponding processing stations 354 and the second processing job B can be associated with a second target material that is roller fed with the second subset 360 of corresponding processing stations 356.

In FIG. 3D, the controller 352 has determined that the number of processing stations 354 engaged in the first processing job A can be reduced to two, and that the processing stations 356 engaged in the second processing job B can be increased. Moreover, a single processing station 362 displays a "C" indicating that the controller 352 has sent a third processing job C to the processing station 362. The third processing job C can also be associated with any laser processing task. For instance, the third processing job C can include testing or research and development for a separate specific laser processing task. Moreover, the third processing job C can be associated with target material that is manually loaded into the processing station 362 by an operator, or with any other suitable loading assembly or method. In still further embodiments, any of the processing stations can be temporarily removed from the array or otherwise taken off-line and reconfigured or repurposed for research and development as needed.

Figure 4:
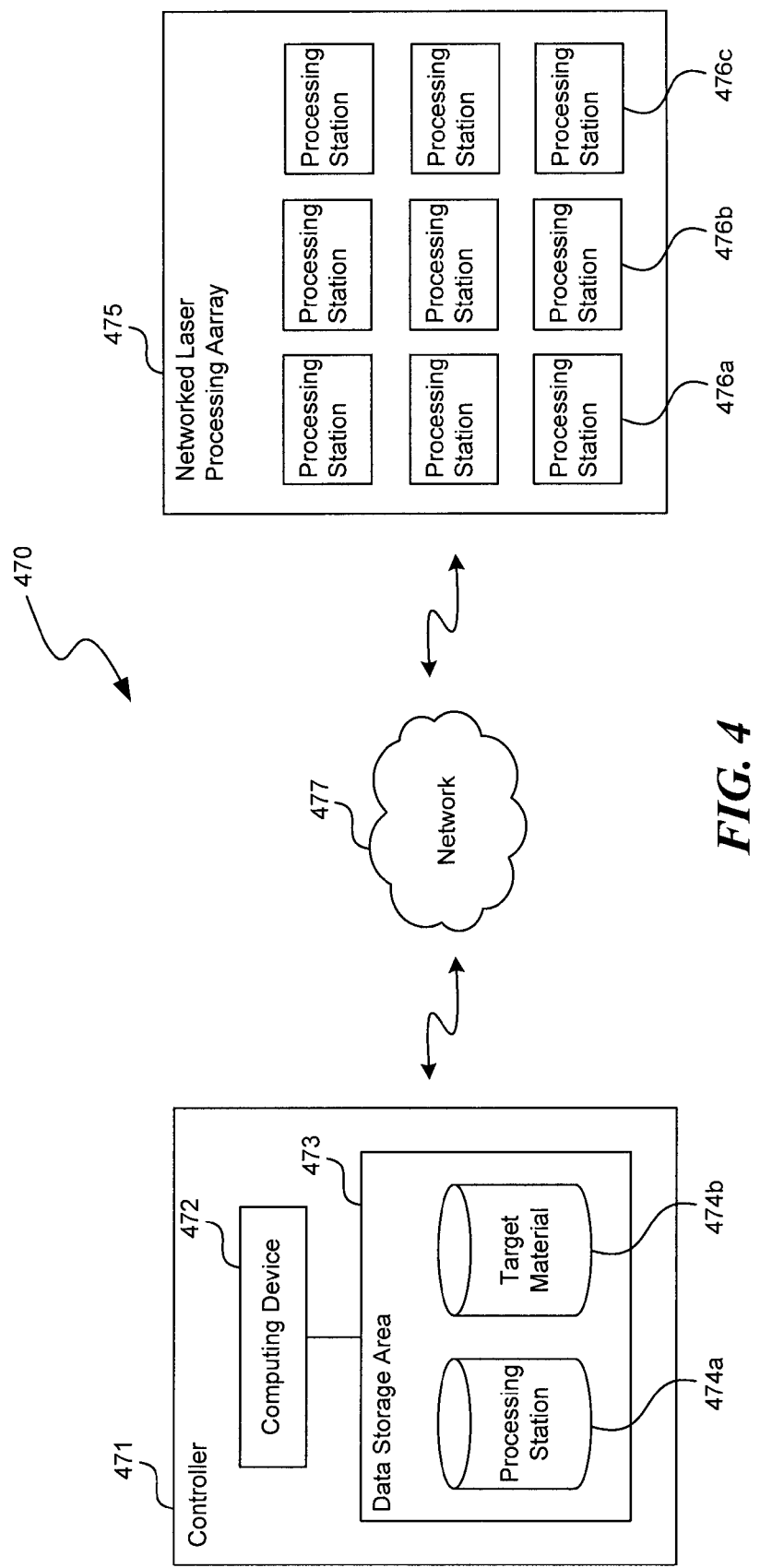
FIG. 4 is a schematic diagram of a suitable computing environment 470 in which a flexible laser manufacturing system can operate in accordance with embodiments of the disclosure.

FIG. 4 is a schematic diagram of a suitable computing environment 470 in which a flexible laser manufacturing system including an array of interconnected or networked laser processing stations as described herein can operate. Although not required, aspects and implementations of the disclosure will be described in the general context of computer-executable instructions, such as routines executed by a general-purpose computer, e.g., a server or personal computer. Those of ordinary skill in the art will appreciate that aspects of the disclosure can be practiced with other computer system configurations, including Internet appliances, set-top boxes, hand-held devices, wearable computers, mobile phones, multiprocessor systems, microprocessor-based systems, minicomputers, mainframe computers, programmable logic controllers, or the like. Aspects of the disclosure can be embodied in a special purpose computer or data processor that is specifically programmed, configured, or constructed to perform one or more of the computer-executable instructions explained in detail below. Indeed, the terms "computer" or "controller" as used generally herein, refers to any of the above devices as well as any data processor or any device capable of communicating with a network, including consumer electronic goods such as gaming devices, cameras, or other electronics having a data processor and other components, e.g., network communication circuitry. Data processors include programmable general-purpose or special-purpose microprocessors, programmable controllers, application specific integrated circuits (ASICs), programmable logic devices (PLDs), or the like, or a combination of such devices. Software may be stored in memory, such as random access memory (RAM), read-only memory (ROM), flash memory, or the like, or a combination of such components. Software may also be stored in one or more storage devices, such as magnetic or optical based disks, flash memory devices, or any other type of non-volatile storage medium or non-transitory medium for data. Software may include one or more program modules which include routines, programs, objects, components, data structures, and so on that perform particular tasks or implement particular abstract data types.

Aspects of the disclosure can also be practiced in distributed computing environments, where tasks or modules are performed by remote processing devices, which are linked through a communications network, such as a Local Area Network ("LAN"), Wide Area Network ("WAN") or the Internet. In a distributed computing environment, program modules or subroutines may be located in both local and remote memory storage devices. Aspects of the disclosure described herein may be stored or distributed on tangible, non-transitory computer-readable media, including magnetic and optically readable and removable computer discs, stored in firmware in chips (e.g., EEPROM chips). Alternatively, aspects of the invention may be distributed electronically over the Internet or over other networks (including wireless networks). Those of ordinary skill in the art will recognize that portions of the disclosure may reside on a server computer, while corresponding portions reside on a client computer. Data structures and transmission of data particular to aspects of the invention are also encompassed within the scope of the disclosure.

Referring to FIG. 4, the computing environment 470 includes one or more controllers 471 that communicate with an interconnected laser processing array 475 over one or more networks 477. The laser processing array 475 includes multiple interconnected laser processing stations 476. The individual processing stations 476 can include features that are generally similar in structure and function to the features of the corresponding laser processing stations described above with reference to FIGS. 1A-3B. The controller 471 is comprised of one or more computing devices 472 that are connected to a data storage area 473. The controller 471 can also include one or more software applications that instruct and control the networked laser processing array 475 as disclosed herein. The data storage area 473 includes a number of databases that are maintained to store or categorize laser processing related parameters. For example, the data storage area 473 includes a processing station database 474a and a target material database 474b. The processing station database 474a is configured to store information related to each processing station including, for example, a machine identifier, model number, laser power output, laser beam delivery assembly speed, etc. The target material database 474b is configured to store information related to each target material including, for example, laser processing settings or parameters associated with types and physical properties of corresponding target materials. The term "database" is used generically herein to indicate a collection of information or records stored in a systematic way. While two databases are illustrated in FIG. 4, those of ordinary skill in the art will appreciate that a greater or lesser number of databases may be utilized.

Figure 5:
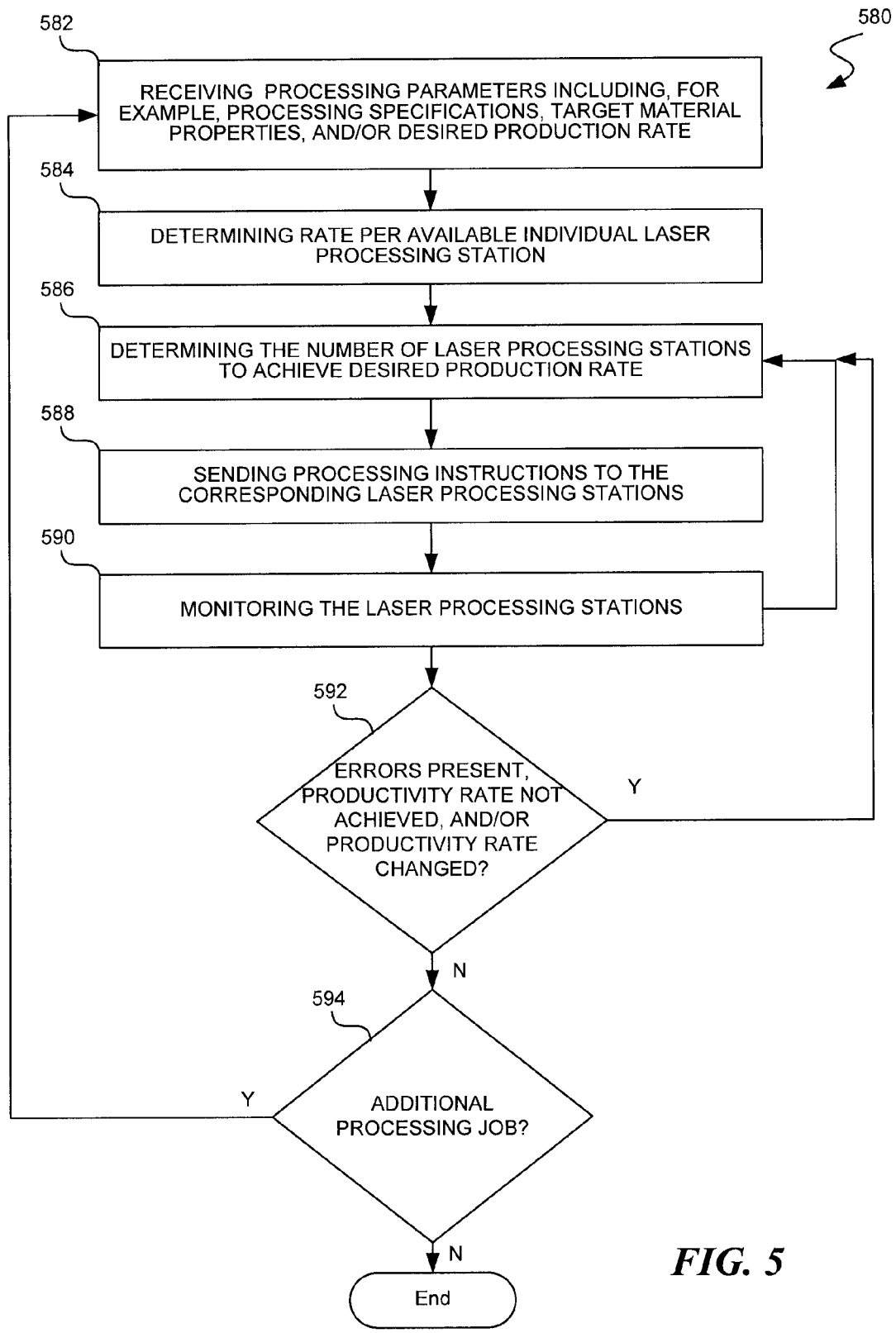
FIG. 5 is a flow diagram of a method or process configured in accordance with embodiments of the disclosure for controlling a networked array of laser processing stations.

FIG. 5 is a flow diagram of a method or process configured in accordance with embodiments of the disclosure for controlling a networked array of laser processing stations. The method can be performed, for example by using any of the systems and associated components described above with reference to FIG. 1A-4. The method 580 includes receiving processing parameters relating to a laser processing job or operation (block 582). In certain embodiments, the processing parameters can include processing specifications, target material properties or specifications (e.g., laser processing settings or parameters associated with types and physical properties of corresponding target materials), and/or a desired production rate. The method 580 also includes determining a production rate for each laser processing station that is available in the networked array of laser processing stations (block 584). Determining the production rate for each laser processing station can be based at least in part on the available laser power and laser beam positioning speed limitations for the corresponding laser processing station, as well as the type of target material and the properties of the target material. In certain embodiments, determining the production rate for each laser processing station can further include running a simulation of the processing to be performed by each laser processing station.

The method 580 can further include determining the number of laser processing stations that are required to achieve the desired production rate (block 586). In some embodiments, determining the number of laser processing stations can include determining the minimum number of laser processing stations that are required to achieve the desired production rate, which can be based at least in part on the previously determined production rate of each processing station. The method 580 further includes sending the processing instructions to the corresponding laser processing stations in the array (block 588). In some embodiments, this may include sending the instructions to all of the laser processing stations in the array. In other embodiments, however, this may include sending the instructions to a subset of the laser processing stations in the array (e.g., at least the minimum number required to complete the assigned processing job).

The method 580 also includes monitoring the status of each of the laser processing stations (block 590). Monitoring the laser processing stations may include, for example, monitoring if any of the stations are malfunctioning or have other types of errors or problems. The monitoring can further include monitoring the productivity rate of each of the laser processing stations, as well as monitoring if a desired production rate has been changed. At decision block 592, if a problem is encountered, and/or if the productivity rate of at least one of the laser processing stations is not at the desired level, and/or if the desired productivity rate has been changed, the method 580 includes returning to block 586 and determining the number of laser processing stations to achieve or maintain the desired production rate. The method 580 can also include reporting any problems, errors, changes in productivity rate of one or more processing stations, etc. In still further embodiments, the method 500 can include monitoring and reporting any relevant processing information, including, for example, productivity rates of the entire group of laser processing stations and productivity rates for one or more subsets of the laser processing stations. These reports can additionally relate to a particular processing job or sets of jobs for one or more discrete periods of time.

If no problems are encountered and/or each laser processing station is achieving its desired production rate and/or the desired productivity rate has not changed, the method 580 further includes determining if an additional processing job is requested (decision block 594). If no additional job is requested, the method 580 can continue until the laser processing stations complete the initial processing job. If an additional job has been requested, the method 580 includes returning to block 582 and recommencing at least a portion of the method 580 according to the additional job parameters. In certain embodiments, for example, this can include determining what group or subset of the laser processing stations can be utilized for the additional processing job to be carried out simultaneously with the initial processing job.

Embodiments of the systems, components, and methods as described herein provide several benefits. For example, systems configured in accordance with embodiments of the disclosure allow for laser compatible manufacturing processes, such as cutting thin plastic films or marking materials, to be quickly deployed using standard laser processing stations. Moreover, because the systems disclosed herein are modular and flexible, these systems also allow the same laser based manufacturing processes to be used from prototyping, to pre-production, to production and then to end of life service requirements by scaling the number of laser processing stations as needed according to production requirements. Moreover, the capacity in the laser processing station array can be quickly repurposed between older and newer products as the products move through their life cycle. Furthermore, the productivity of these types of systems can be quickly and easily scaled to meet processing requirements by adding additional laser processing stations into the array. Also, these systems allow manufacturing requirements for various material processing jobs to be quickly and easily balanced and rebalanced across the array as needed to maximize flexibility. Furthermore, these types of systems also allow productivity to be maintained during repair and maintenance by allowing jobs to be rebalanced across the array if an individual laser processing station must be temporarily taken off line.

From the foregoing, it will be appreciated that specific embodiments of the disclosure have been described herein for purposes of illustration, but that various modifications may be made without deviating from the spirit and scope of the various embodiments of the disclosure. For example, although many features of the system are described above with reference to singular components that are illustrated schematically in the Figures, in other embodiments the system can include multiple components. Further, while various advantages associated with certain embodiments of the disclosure have been described above in the context of those embodiments, other embodiments may also exhibit such advantages, and not all embodiments need necessarily exhibit such advantages to fall within the scope of the disclosure.

We claim:

1. A flexible laser manufacturing system comprising:
an array of multiple laser processing stations, each laser processing station including
  a support configured to support a target material to be processed;
  a laser source configured to emit a laser beam for processing target material;
  a laser beam delivery assembly configured to direct the laser beam relative to target material; and
  a control module coupled to each of the laser source and the laser beam delivery assembly, wherein the control module is configured to control the laser source and the laser beam delivery assembly, and
a controller operably coupled to the array of multiple laser processing stations, wherein the controller is configured to
determine a production rate for each laser processing station of the array of multiple laser processing station by running a simulation of processing to be performed by each of the laser processing stations, wherein the determination of the production rate is based at least in part on a material type of the target material and available laser power and laser beam positioning speed limitations of the corresponding laser processing stations;
allocate a number of the laser processing stations to a processing job based on their corresponding production rates determined via the simulation;
monitor a processing status of each of the laser processing stations; and
send processing instructions to the corresponding control modules of each of the allocated laser processing stations.

2. The system of claim 1 wherein at least one of the laser processing stations further comprises a target material handling assembly configured to deliver target material to the corresponding support.

3. The system of claim 2 wherein target material associated with the at least one processing station includes a roll of target material, and wherein the target material handling assembly comprises a roller assembly configured to deliver target material to the corresponding support.

4. The system of claim 2 wherein target material associated with the at least one processing station includes multiple separate sheets of target material or trays holding target material, and wherein the material handling assembly includes a frame configured to support the corresponding sheets of target material or trays.

5. The system of claim 1 wherein the array of multiple laser processing stations includes:
a first subset of laser processing stations configured to process target material according to first processing parameters from the controller; and
at least one second laser processing station configured to process target material according to second processing parameters from the controller, wherein the second processing parameters are different from the first processing parameters.

6. The system of claim 5 wherein the array of multiple laser processing stations includes at least one third laser processing station configured to process target material according to third processing parameters from the controller that are different from the first and second processing parameters, and wherein:
the first processing parameters are associated with a first product;
the second processing parameters are associated with a second product different than the first product; and
the third processing parameters are associated with a third product different than the first and second products.

7. The system of claim 1 further comprising an idle laser processing station, wherein the idle processing station is configured to replace one of the laser processing stations.

8. The system of claim 1 wherein:
each laser source has a corresponding laser power output and range of modulation rates and each laser beam delivery assembly is capable of a range of positioning speeds; and
the controller is further configured to manage the laser power output, laser modulation rate, and positioning speed of each laser processing station to control processing across the array of multiple laser processing stations.

9. The system of claim 1 wherein the controller is further configured to:
determine a production rate of at least one of the laser processor processing stations by running a simulation of processing to be performed by the at least one of the processing stations when the laser source of the least one of the laser processing stations has been interchanged with a different laser source, wherein the determined production rate of the at least one of the laser processing stations is based at least in part on a power limitation of the different laser source; and
allocate the at least one of the processing stations to the processing job based on a result of the simulation.

10. The system of claim 1 wherein the controller is further configured to estimate a productivity rate of at least one subset of the array of multiple laser processing stations to determine a minimum number of individual laser processing stations to accommodate a predetermined production rate.

11. The system of claim 1 wherein the controller is further configured to:
monitor an actual production rate of the individual laser processing stations; and
reallocate one or more laser processing stations in response to the actual production rates to achieve a desired production rate.

12. The system of claim 1 wherein the controller is further configured to:
monitor an actual production rate of the individual laser processing stations; and
generate an alert if one or more of the individual laser processing stations is not maintaining a desired production rate.

13. A flexible laser manufacturing system comprising:
a plurality of laser processing stations, wherein each of the laser processing stations includes
a laser source configured to generate a laser beam for processing target material; and
a first controller coupled to the laser source; and
a second controller coupled to the first controller of the individual laser processing stations, wherein the second controller is configured to
determine a production rate for each laser processing station of the plurality of laser processing stations by performing a simulation of processing to be performed by each least processing station, wherein the determination of the production rate is based at least in part on one or more physical properties of the target material and available laser power and laser beam positioning speed limitations of the corresponding laser processing stations,
allocate a processing job to a number of the individual laser processing stations based on their corresponding production rates determined via the simulation to achieve a desired production rate, and
send processing instructions to each of the first controllers of the individual laser processing stations allocated to the processing job.

14. The system of claim 13 wherein the processing instructions are first processing instructions and the target material is a first target material, and wherein the second controller is further configured to send the first processing instructions to a first subset of the processing stations for processing the first target material, and wherein the second controller is configured to send second processing instructions to a second subset of the processing stations different from the first subset for processing a second target material.

15. The system of claim 13 wherein the second controller is configured to monitor a processing status of the individual processing stations.

16. A method of controlling a networked array of multiple laser processing stations, wherein the method is performed by a computing system having a processor and a memory, the method comprising:
determining a production rate for each laser processing station that is available in the array of laser processing stations, wherein determining the production rate includes performing a simulation of processing to be performed by each laser processing station and based at least in part on a material type of the target material and available laser power and laser beam positioning speed limitations of the corresponding laser processing stations;
selecting a number of laser processing stations in the array based on their corresponding production rates determined via the simulation to achieve a desired processing production rate, wherein not all of the corresponding production rates of the selected laser processing stations are the same;
sending processing instructions to the selected laser processing stations in the array based on their corresponding production rates determined via the simulation; and
monitoring the status of each of the laser processing stations.

17. The method of claim 16 wherein determining the production rate includes determining the production rate for each laser processing station based on at least one of the following for the corresponding laser processing stations: available laser power, maximum and minimum laser beam positioning speed, and target material thickness.

18. The method of claim 16 wherein selecting the number of laser processing stations includes determining the minimum number of laser processing stations that are required to achieve the desired production rate.

19. The method of claim 16 wherein sending the processing instructions includes sending the processing instructions to a subset of the laser processing stations in the array.

20. The method of claim 19 wherein when the laser processing stations in the subset of the array are unable to achieve the desired processing production rate, the method further comprises automatically reducing the desired processing production rate to a rate that is achievable by the laser processing stations in the subset of the array.

21. The method of claim 19 wherein when the laser processing stations in the subset of the array are unable to achieve the desired processing production rate, the method further comprises determining the number of additional laser processing stations that are required to achieve the desired processing production rate.

22. The method of claim 19 wherein the processing instructions are first processing instructions and the subset is a first subset, and wherein the method further includes sending second processing instructions to a second subset of the laser processing stations in the array, wherein the second processing instructions are different from the first processing instructions and the second subset is different from the first subset.

23. The method of claim 16 wherein monitoring the status of each of the laser processing stations including monitoring at least one of the following for the corresponding laser processing stations: an error status and a real-time productivity rate.

24. The method of claim 16, further comprising reporting an indication of the status of one or more of the laser processing stations.

25. The method of claim 16, further comprising interchanging a first laser source of at least one of the laser processing stations with a second laser source, wherein determining the production rate includes running a simulation of processing to be performed by the at least one of the processing stations based at least in part on available laser power and laser beam positioning speed limitations of the at least one laser processing station after the second laser source has been interchanged with the first laser source.

26. The method of claim 16 wherein before performing the simulation of the processing to be performed by each laser processing station, the method further comprises accessing a database to retrieve processing parameters relating to the individual processing stations, wherein the processing parameters include the material type of the target material and the available laser power and laser beam positioning speed limitations of the corresponding laser processing stations.

* * * * *